United States Patent
Nagasaka

(10) Patent No.: US 9,712,718 B2
(45) Date of Patent: Jul. 18, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hitoshi Nagasaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/861,954

(22) Filed: Sep. 22, 2015

(65) Prior Publication Data
US 2016/0088185 A1    Mar. 24, 2016

(30) Foreign Application Priority Data
Sep. 24, 2014 (JP) .................... 2014-194369

(51) Int. Cl.
    *H04N 1/387*      (2006.01)
    *H04N 1/393*      (2006.01)
    *G06K 15/02*      (2006.01)
    *H04N 1/40*       (2006.01)
    *H04N 1/409*      (2006.01)
    *G06K 9/44*       (2006.01)

(52) U.S. Cl.
    CPC ............ *H04N 1/3935* (2013.01); *G06K 9/44* (2013.01); *G06K 15/1838* (2013.01); *H04N 1/3871* (2013.01); *H04N 1/40062* (2013.01); *H04N 1/4092* (2013.01)

(58) Field of Classification Search
None
See application file for complete search history.

(56) References Cited

U.S. PATENT DOCUMENTS

| | | | | |
|---|---|---|---|---|
| 4,010,446 A | * | 3/1977 | Kawa ................. | G06K 9/44 382/258 |
| 5,054,099 A | * | 10/1991 | Wakabayashi ........ | G06T 3/40 358/451 |
| 5,309,524 A | * | 5/1994 | Hirabayashi ........ | H04N 1/3935 358/451 |
| 5,539,534 A | * | 7/1996 | Hino ................ | G06T 3/40 358/448 |
| 5,680,225 A | * | 10/1997 | Hirabayashi ........ | H04N 1/3935 358/451 |

(Continued)

FOREIGN PATENT DOCUMENTS

JP          5-73026 A       3/1993

*Primary Examiner* — Ted Barnes
(74) *Attorney, Agent, or Firm* — Canon U.S.A., Inc. IP Division

(57) ABSTRACT

An image processing apparatus includes an acquisition unit configured to acquire a plurality of points defining a plurality of line segments constituting an outline of an object, an identification unit configured to identify a first line segment constituting the outline and having a shorter distance to a second line segment constituting the outline in a predetermined direction than a threshold by calculating a distance in the predetermined direction between the first line segment and the second line segment based on coordinates of the plurality of points, a correction unit configured to perform correction relating to an end point of the identified first line segment which is included in the plurality of points, and a rasterization unit configured to rasterize the object based on the plurality of corrected points.

12 Claims, 9 Drawing Sheets

(56) References Cited

U.S. PATENT DOCUMENTS

| | | | | |
|---|---|---|---|---|
| 5,706,098 | A * | 1/1998 | Clark | H04N 1/4092 347/188 |
| 7,142,328 | B2 * | 11/2006 | Ohmori | G06T 3/40 358/1.2 |
| 2001/0021035 | A1 * | 9/2001 | Takashimizu | H04N 1/4052 358/1.9 |
| 2002/0172431 | A1 * | 11/2002 | Atkins | G06T 5/20 382/260 |
| 2004/0207881 | A1 * | 10/2004 | Nomura | G06T 3/403 358/3.24 |
| 2004/0218195 | A1 * | 11/2004 | Ogawa | G06K 15/02 358/1.2 |
| 2005/0041883 | A1 * | 2/2005 | Maurer | G06K 9/40 382/260 |
| 2005/0237544 | A1 * | 10/2005 | Suzuki | G06T 3/4015 358/1.2 |
| 2006/0132818 | A1 * | 6/2006 | Suzuki | G06F 3/1204 358/1.13 |
| 2006/0181595 | A1 * | 8/2006 | Ishikawa | G03G 15/043 347/130 |
| 2006/0285130 | A1 * | 12/2006 | Yokota | G06T 11/203 358/1.2 |
| 2007/0002080 | A1 * | 1/2007 | Ishizaka | G06K 15/02 345/660 |
| 2007/0139668 | A1 * | 6/2007 | Wen | G06K 15/02 358/1.9 |
| 2009/0097776 | A1 * | 4/2009 | Fukamachi | H04N 1/405 382/269 |
| 2009/0214119 | A1 * | 8/2009 | Oishi | G06T 11/203 382/190 |
| 2013/0003083 | A1 * | 1/2013 | Satomi | H04N 1/3935 358/1.2 |
| 2014/0314334 | A1 * | 10/2014 | Li | H04N 1/4092 382/267 |

* cited by examiner

BEFORE REDUCTION

AFTER REDUCTION

… (1)

IMAGE PROCESSING APPARATUS, IMAGE PROCESSING METHOD, AND STORAGE MEDIUM

BACKGROUND OF THE INVENTION

Field of the Invention

The present invention relates to an image processing method, and particularly relates to an image processing method in an information processing system such as a personal computer, a printing apparatus, etc.

Description of the Related Art

An outline (shape) of an object such as a character, a line, a graphic, etc. can be represented by a straight or curved line formed by sequentially connecting coordinates of a plurality of points. A connection path of such points is called a path. A drawing command to define an outline of an object using a point sequence with a determined connection order is called point sequence data. There are cases where a portion of an object defined by such point sequence data is lost as a result of rasterization processing. A portion of an object is likely to be lost especially when point sequence data undergoes N-up layout processing or resolution conversion processing for adjustment to the printing resolution of a print engine of a printing apparatus. In layout processing or resolution conversion processing on point sequence data, a host personal computer (host PC), a printing apparatus, or the like reduces the size of an object by converting the coordinates of each point included in the point sequence according to the reduction rate of the layout processing or the resolution ratio of the resolution conversion processing. When the size of the object is reduced, the width of a portion of the object becomes so narrow that depending on the resolution and fill rule in the rasterization, the portion may be lost. This problem is illustrated in FIG. 1. In FIG. 1, when the size of the character object "H" is reduced, the lateral line that is a part of the object is lost.

Japanese Patent Application Laid-Open No. 5-73026 discusses a method for avoiding loss of the width of an object represented by point sequence data as a result of rasterization processing. In this method, a lateral line portion of an object is identified based on a combination of the direction of a path connecting a first point, which is a previous point to a second point, to the second point in a point sequence, and the direction of a path connecting the second point to a third point, which is a subsequent point to the second point. Then, in the method, the coordinates of the points constituting the lateral line portion are shifted in a longitudinal direction to correct a path representing an outline (shape) of the lateral line portion.

In the method discussed in Japanese Patent Application Laid-Open No. 5-73026, a path representing an outline of any specific portion (lateral line portion) is corrected. In other words, even if the specific portion is wide enough not to be lost as a result of rasterization processing, the path representing the outline of the specific portion is corrected. Since the path of a portion that does not need to be corrected is also corrected, the shape of an object becomes different from the shape of the object represented by the original path.

SUMMARY OF THE INVENTION

According to an aspect of the present invention, an image processing apparatus includes an acquisition unit configured to acquire a plurality of points defining a plurality of line segments constituting an outline of an object, an identification unit configured to identify a first line segment constituting the outline and having a shorter distance to a second line segment constituting the outline in a predetermined direction than a threshold by calculating a distance in the predetermined direction between the first line segment and the second line segment based on coordinates of the plurality of points, a correction unit configured to perform correction relating to an end point of the identified first line segment which is included in the plurality of points, and a rasterization unit configured to rasterize the object based on the plurality of corrected points.

Further features of the present invention will become apparent from the following description of exemplary embodiments with reference to the attached drawings.

DESCRIPTION OF THE EMBODIMENTS

Various exemplary embodiments of the present invention will be described with reference to the drawings.

<Hardware Configuration of Print Processing System>

Figure 1:
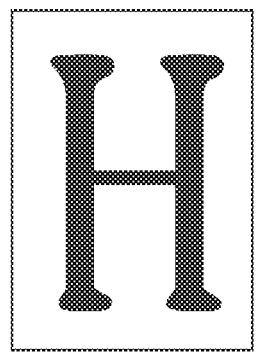
FIG. 1 illustrates an example of a case where a portion of an object is lost.
Figure 1:
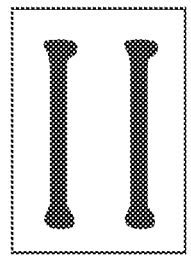
Figure 2:
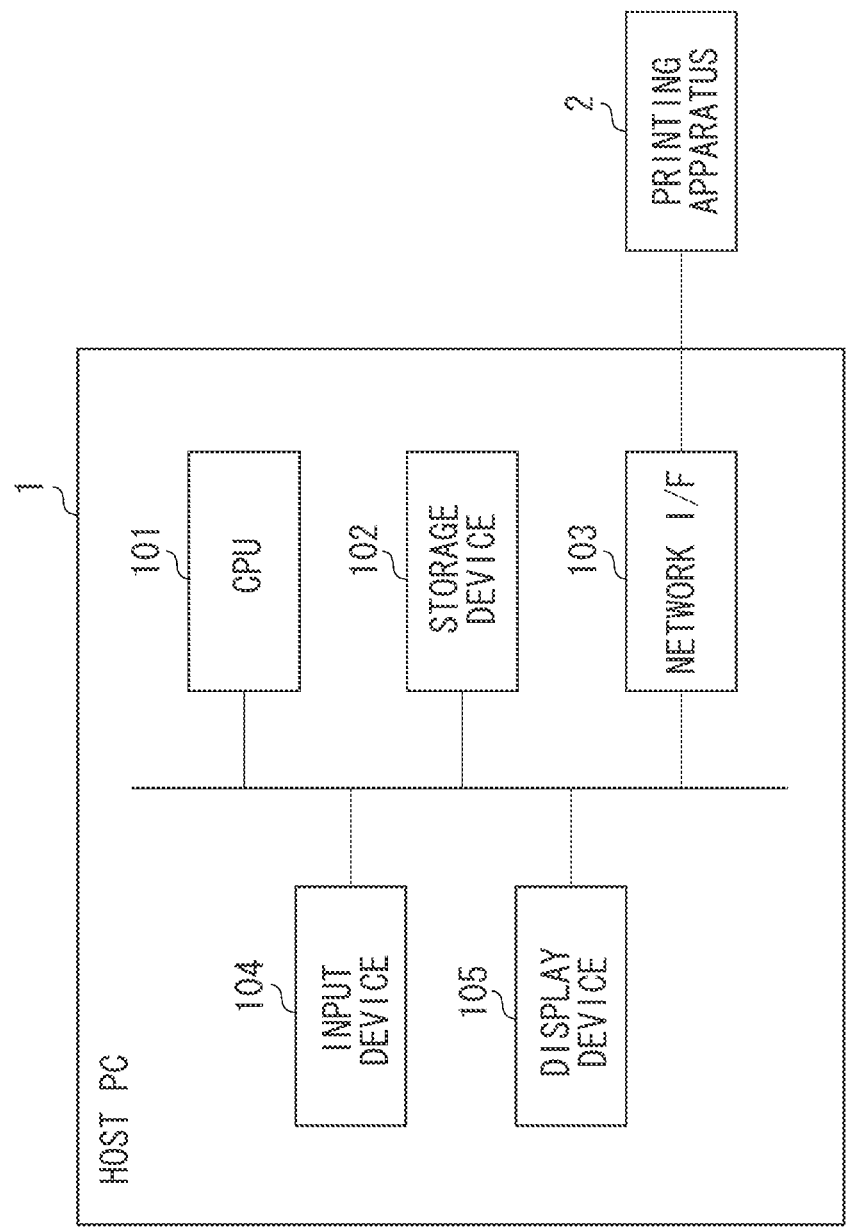
FIG. 2 is a block diagram illustrating an example of a configuration of a print processing system according to an exemplary embodiment.

FIG. 2 is a block diagram illustrating a hardware configuration of a print processing system according to a first exemplary embodiment. The print processing system includes a host personal computer (host PC) 1 and a printing apparatus 2. The host PC 1 and the printing apparatus 2 are connected to each other via a local area network (LAN). While the host PC 1 and the printing apparatus 2 are connected via the LAN in the present exemplary embodiment, the host PC 1 and the printing apparatus 2 may be connected via a wide area network (WAN) or may be connected directly via a universal serial bus (USB) cable.

The host PC 1 according to the present exemplary embodiment is an example of an image processing apparatus configured to perform object size reduction processing (layout processing and resolution conversion processing) and rasterization processing, which will be described below. The host PC 1 includes a central processing unit (CPU) 101, a storage device 102, a network interface (I/F) 103, an input device 104, and a display device 105.

Figure 3:
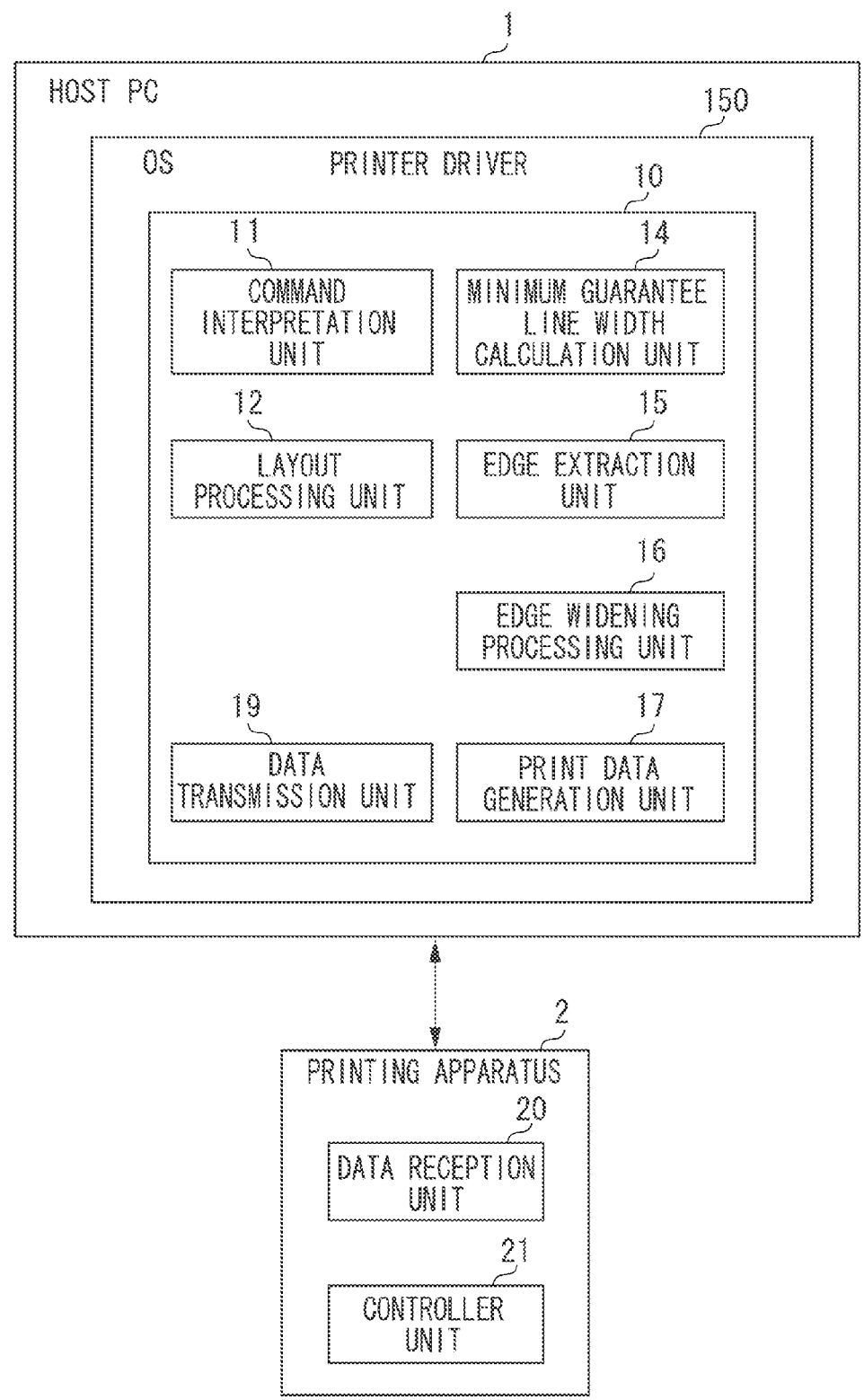
FIG. 3 is a block diagram illustrating a configuration of an entire print processing system according to an exemplary embodiment.

The storage device 102 according to the present exemplary embodiment includes a random access memory (RAM), a read-only memory (ROM), and a hard disk drive (HDD). The storage device 102 stores an operating system (OS) 150 illustrated in FIG. 3 and various programs for realizing a printer driver 10 running on the OS 150. The CPU 101 comprehensively controls respective units illustrated in FIG. 2 by reading and executing the programs from the storage device 102. The OS 150 and the printer driver 10 illustrated in FIG. 3 are realized by the CPU 101 comprehensively controlling the respective units.

The network interface 103 is an interface for connecting the host PC 1 and the printing apparatus 2 to each other and is used to transmit and receive data to and from between the host PC 1 and the printing apparatus 2.

The input device 104 includes, for example, a keyboard and a pointing device and functions as a user interface for receiving from a user an instruction to print data generated by drawing application software (not illustrated). Further, the input device 104 receives settings relating to the print layout such as 1-in-1 and 4-in-1 from the user.

The display device 105 includes, for example, a display and functions as a user interface for displaying a print instruction screen when the user is to give an instruction to print data generated by the drawing application software. The print instruction screen also serves as a setting screen for the print layout described above.

The printing apparatus 2 includes a network interface (not illustrated) and a print engine (not illustrated). The printing apparatus 2 receives print data from the host PC 1 via the network interface and prints the print data on a sheet by use of the print engine. The printing apparatus 2 according to the present exemplary embodiment may be a single function printer (SFP) including only a printing function or a multi-function peripheral (MFP) including a scan function, etc. as well as a printing function. Further, the print engine included in the printing apparatus 2 may be any print engine according to an electrophotographic method, inkjet method, or any other method and is not limited to a print engine of a specific method. The print engine according to the present exemplary embodiment prints each pixel of image data with dots of 1/400 [inch] height and 1/600 [inch] width. In other words, the printing resolution of the print engine according to the present exemplary embodiment is 400 [dpi] height by 600 [dpi] width, the present exemplary embodiment is not limited to this resolution. For example, if the print engine further includes a mode for printing an image with high-resolution image quality by reducing the sheet conveying speed, the printing resolution can be selected from two printing resolutions.

<Software Configuration of Print Processing System>

FIG. 3 is a block diagram illustrating a software configuration of the print processing system according to the present exemplary embodiment.

The OS 150 in the host PC 1 controls basic operations of the host PC 1. When the OS 150 receives an instruction to print data generated by the application program, the OS 150 invokes the printer driver 10 and passes a drawing command to the printer driver 10. More specifically, when the OS 150 receives a print instruction, the OS 150 acquires data from the application and converts the data into a drawing command in a format that can be interpreted by the printer driver 10. Then, the OS 150 stores the converted drawing command as a spool file in the storage device 102 and instructs the printer driver 10 to acquire and process the stored spool file. At the time of the receiving and passing of the data, the OS 150 also passes to the printer driver 10 (layout processing unit 12) settings data relating to the print layout which is received from the user via the input device 104.

The printer driver 10 is one of the applications for controlling a printing apparatus that are realized on the OS 150. The printer driver 10 includes a command interpretation unit 11, the layout processing unit 12, a minimum guarantee line width calculation unit 14, an edge extraction unit 15, an edge widening processing unit 16, a print data generation unit 17, a print command control unit 18, and a data transmission unit 19.

The printer driver 10 according to the present exemplary embodiment receives a drawing command of a specific resolution (e.g., 600 dpi height by 600 dpi width) from the OS 150. Then, the printer driver 10 performs rasterization processing at the specific resolution to generate raster data. In the present exemplary embodiment, the resolution conversion processing is also performed in the rasterization processing to generate raster data while taking the printing resolution (e.g., 400 dpi height by 600 dpi width) into consideration as described below. The size of an object expressed by the drawing command is reduced by the resolution conversion processing. Thus, when the object having undergone the resolution conversion processing is rasterized at the specific resolution, a portion of the object may be lost from the raster data. In view of the foregoing problem, the printer driver 10 according to the present exemplary embodiment performs processing to increase the width of the portion of the object so that the portion will not be lost from the raster data even when the reduced object is rasterized. Then, the printer driver 10 transmits the generated raster data to the printing apparatus 2.

Figure 7:
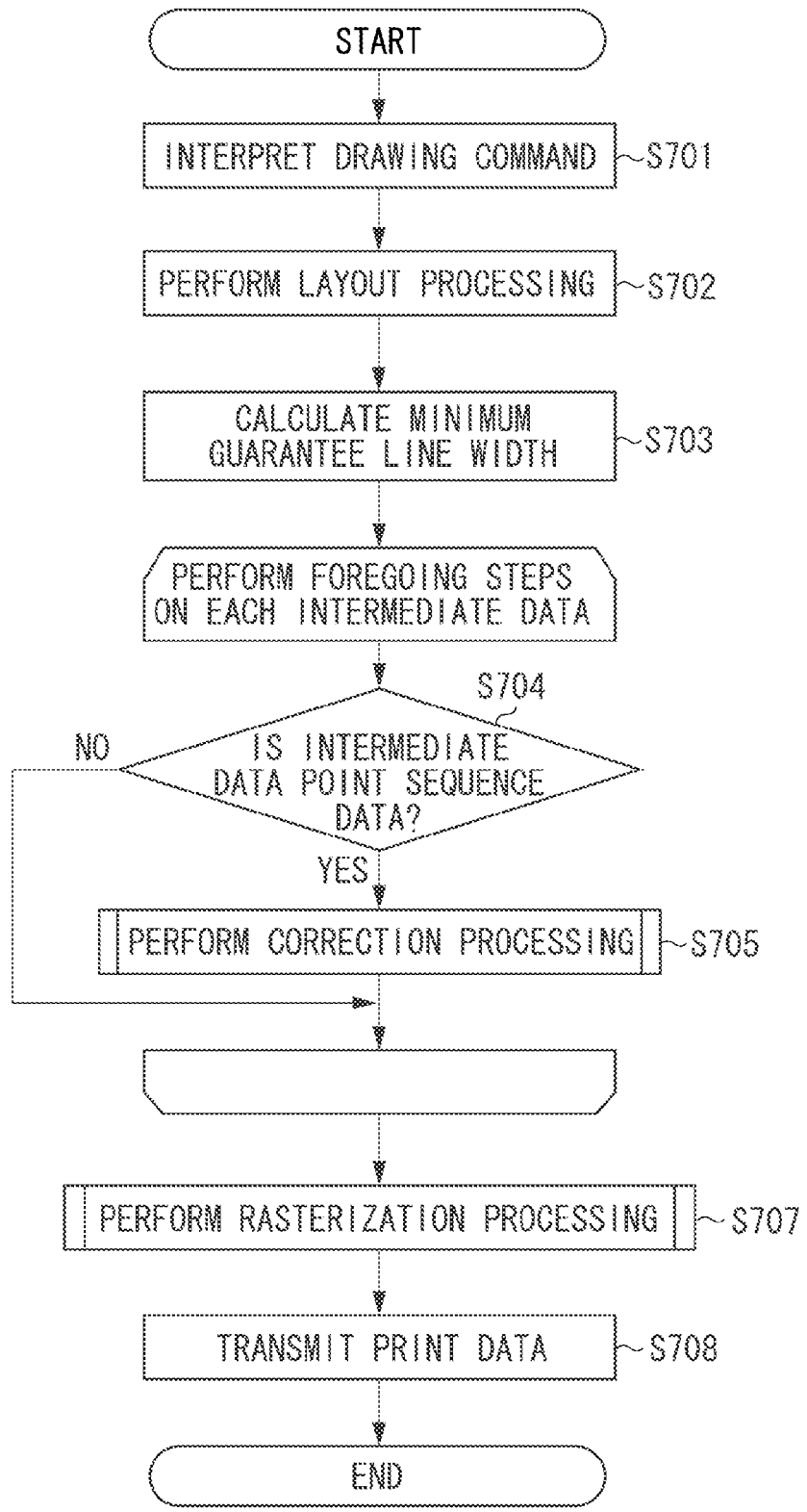
FIG. 7 is a main flow chart illustrating an image processing method according to an exemplary embodiment.

The command interpretation unit 11 performs the processing of step S701 in FIG. 7. More specifically, the command interpretation unit 11 interprets a drawing command included in a spool file received from the OS 150 and converts the drawing command into intermediate data. A case where the drawing command is point sequence data defining an outline of an object such as a character, a line, or a graphic will be described below as an example. The point sequence data refers to data representing a plurality of points. The point sequence data is also referred to simply as a point sequence. Each point has coordinates (X, Y), and a connection path (also referred to as "path" or "edge") of a line segment connecting points represents a portion of an outline of an object. In other words, a path connecting points represents the shape of the object. An X-coordinate of the coordinates (X, Y) indicates a position in an X-axis direction, and a Y-coordinate indicates a position in a Y-axis direction. In the present exemplary embodiment, the X-axis direction is referred to as a lateral direction, and the Y-axis direction is referred to as a longitudinal direction. The lateral direction and the longitudinal direction are orthogonal to each other. The connection order of points is the same as the description order of the points in the point sequence data. The command interpretation unit 11 having acquired the point sequence data generates data having a link configuration in which the coordinates of points included in the point sequence are connected in the connection order. The generated data is the intermediate data, and the generation processing is referred to as conversion of the drawing command into the intermediate data.

The layout processing unit 12 performs the processing of step S702 in FIG. 7. More specifically, the layout processing unit 12 performs the layout processing on intermediate data converted by the command interpretation unit 11 based on settings data relating to the print layout which is received from the OS 150. The layout processing is coordinates conversion processing in which, if the print layout setting is 4-in-1, the coordinates of points included in the intermediate data are converted to reduce the size of the object by ½ in the longitudinal direction (Y-axis direction) and in the lateral direction (X-axis direction).

The minimum guarantee line width calculation unit 14 performs the processing of step S703 in FIG. 7. More specifically, the minimum guarantee line width calculation unit 14 calculates a minimum width (hereinafter, "minimum guarantee line width") of a portion of the object with which the portion of the object will not be lost by the rasterization processing performed by the print data generation unit 17. The minimum width is a width in the direction (e.g., Y-axis (longitudinal) direction) of the reduction by the resolution conversion processing performed in the rasterization processing. Further, the minimum width is calculated based on the printing resolution of the print engine included in the printing apparatus 2. For example, a predetermined printing resolution may be used as the printing resolution, or a printing resolution acquired by the minimum guarantee line width calculation unit 14 through inquiry to the printing apparatus 2 via the network I/F may be used. The rasterization resolution in the present exemplary embodiment is equal to the resolution of the drawing command received from the OS 150. More specifically, the resolution is 600 dpi height by 600 dpi width. The minimum guarantee line width in the present exemplary embodiment is 1/N [inch], where N [dpi (dot per inch)] is the printing resolution. In a case where the printing resolution is 400 [dpi] height by 600 [dpi] width, the minimum guarantee line width in the longitudinal direction is ¼₀₀ [inch], which is the inverse number of the printing resolution. More specifically, in a case where the distance (width) in the longitudinal direction between line segments represented by vector data is ¼₀₀ [inch], the vector data having undergone the resolution conversion processing is rasterized at the rasterization resolution (600 dpi) at least to the width of 1 dot or greater. Thus, the portion of the object is not likely to be lost. In the present exemplary embodiment, data of a point sequence corresponding to a portion of an object that is likely to be lost by the rasterization processing is corrected using the minimum guarantee line width so that the portion will not be lost. In other words, the position of a path representing the shape of the object is shifted.

The edge extraction unit 15 performs the processing of step S704 and a part of the processing of step S705 in FIG. 7. More specifically, the edge extraction unit 15 extracts paths (edge) of line segments constituting a portion of an object represented by point sequence data that is likely to be lost. The edge extraction unit 15 calculates the distance (width) in the longitudinal direction between a plurality of edges, i.e., the width of the portion of the object in the longitudinal direction. Then, the edge extraction unit 15 determines whether the calculated width is narrower than the minimum guarantee line width (i.e., smaller than the threshold) and extracts a path (edge) corresponding to the portion of the object that has a narrower width than the minimum guarantee line width. In the edge extraction, the edge extraction unit 15 also acquires the width between the extracted edges. While a method for avoiding a case where the portion is lost or becomes solid in the Y-axis direction will be described below, the present exemplary embodiment is also applicable to the X-axis direction by changing X and Y or applicable to both the X-axis and Y-axis directions at the same time. Details of the processing will be described below with reference to FIG. 4.

The edge widening processing unit 16 performs a part of the processing of step S705 in FIG. 7. More specifically, the edge widening processing unit 16 increases the width of the portion of the object by shifting the position of the path (edge) extracted by the edge extraction unit 15. In this way, the portion of the object is prevented from being lost by the rasterization processing. Details of the processing will be described below with reference to FIGS. 6A to 6E.

The print data generation unit 17 performs the processing of step S707 in FIG. 7 to generate print data.

The data transmission unit 19 performs the processing of step S708 in FIG. 7 to transmit the print data generated by the print data generation unit 17 to the printing apparatus 2.

The printing apparatus 2 includes a data reception unit 20 and a controller unit 21. The data reception unit 20 controls the network I/F (not illustrated) and receives print data from the data transmission unit 19 of the host PC 1. The controller unit 21 controls the print engine (not illustrated) and performs printing based on the received print data.

<Flow Chart According to the Present Exemplary Embodiment>

FIG. 7 is a flow chart illustrating processing performed by the printer driver 10 according to the present exemplary embodiment.

In step S701, the command interpretation unit 11 interprets a drawing command in a spool file and generates intermediate data, as described above.

Next, in step S702, the layout processing unit 12 performs the layout processing on the intermediate data generated in step S701, as described above.

Next, in step S703, the minimum guarantee line width calculation unit 14 calculates a minimum guarantee line width based on the printing resolution, as described above.

Next, in step S704, the edge extraction unit 15 determines whether the intermediate data having undergone the layout processing is point sequence data. If the edge extraction unit 15 determines that the intermediate data is point sequence data (YES in step S704), then in step S705, the edge extraction unit 15 and the edge widening processing unit 16 perform the correction processing (FIG. 8) of step S705. On the other hand, if the edge extraction unit 15 determines that the intermediate data is not point sequence data (NO in step S704), the correction processing of step S705 is not performed.

Steps S704 and S705 are repeated to perform the processing of step S704 and the processing of step S705 on each intermediate data.

In step S707, the print data generation unit 17 performs the rasterization processing on the intermediate data included in a page, as described above. In the present exemplary embodiment, the rasterization processing includes the resolution conversion processing. More specifically, the print data generation unit 17 performs the resolution conversion processing on the intermediate data based on the ratio between the rasterization resolution and the printing resolution. For example, in a case where the resolution of the intermediate data is 600 dpi height by 600 dpi width and the rasterization resolution is 400 dpi height by 600 dpi width, the size of the object is reduced by a factor of ⅔ in the longitudinal direction by the resolution conversion processing. In a case where the intermediate data is a bitmap, the print data generation unit 17 performs the resolution conversion processing by thinning one line among three lines extending in the lateral direction. In a case where the intermediate data is vector graphics such as point sequence data, the print data generation unit 17 performs the resolution conversion processing by performing the coordinates conversion processing on the coordinates of each point included in the point sequence by use of a conversion matrix to reduce the size of the object by a factor of ⅔ in the longitudinal direction.

Then, the print data generation unit 17 rasterizes at the rasterization resolution (600 dpi height by 600 dpi width) the intermediate data having undergone the resolution conversion processing to generate raster data of the page. In the case where the intermediate data is a bitmap, the rasterization processing is the processing to write the bitmap to a page memory in the storage device 102. Further, in the case where the intermediate data is vector graphics, the rasterization processing is the processing to generate data representing the outline of the object from the intermediate data and then fill with the color of the object a space in the outline (inside of the object) represented by the generated data according to a rule for the filling. The filling processing corresponds to the processing to write the color of the object to the page memory. The rasterization of the intermediate data is performed using a publicly-known method, so detailed description thereof is omitted.

Then, the print data generation unit 17 generates print data in a format that can be interpreted by the printing apparatus 2 from the generated raster data of the rasterization resolution. The print data is data having the rasterization resolution, and examples thereof include raster data, Joint Photographic Experts Group (JPEG)-compressed raster data, etc. The print data may be described in a page description language (PDL).

In step S708, the data transmission unit 19 transmits the print data generated by the print data generation unit 17 to the printing apparatus 2. Then, the printing apparatus 2 prints the print data at the printing resolution using the printer engine. For example, the raster data having the rasterization resolution (e.g., 600 dpi height by 600 dpi width) in the print data is enlarged (extended in the longitudinal direction) to the printing resolution (e.g., 400 dpi height by 600 dpi width) and printed.

The foregoing describes the series of processes according to the present exemplary embodiment.

<Correction Processing>

Figure 8:
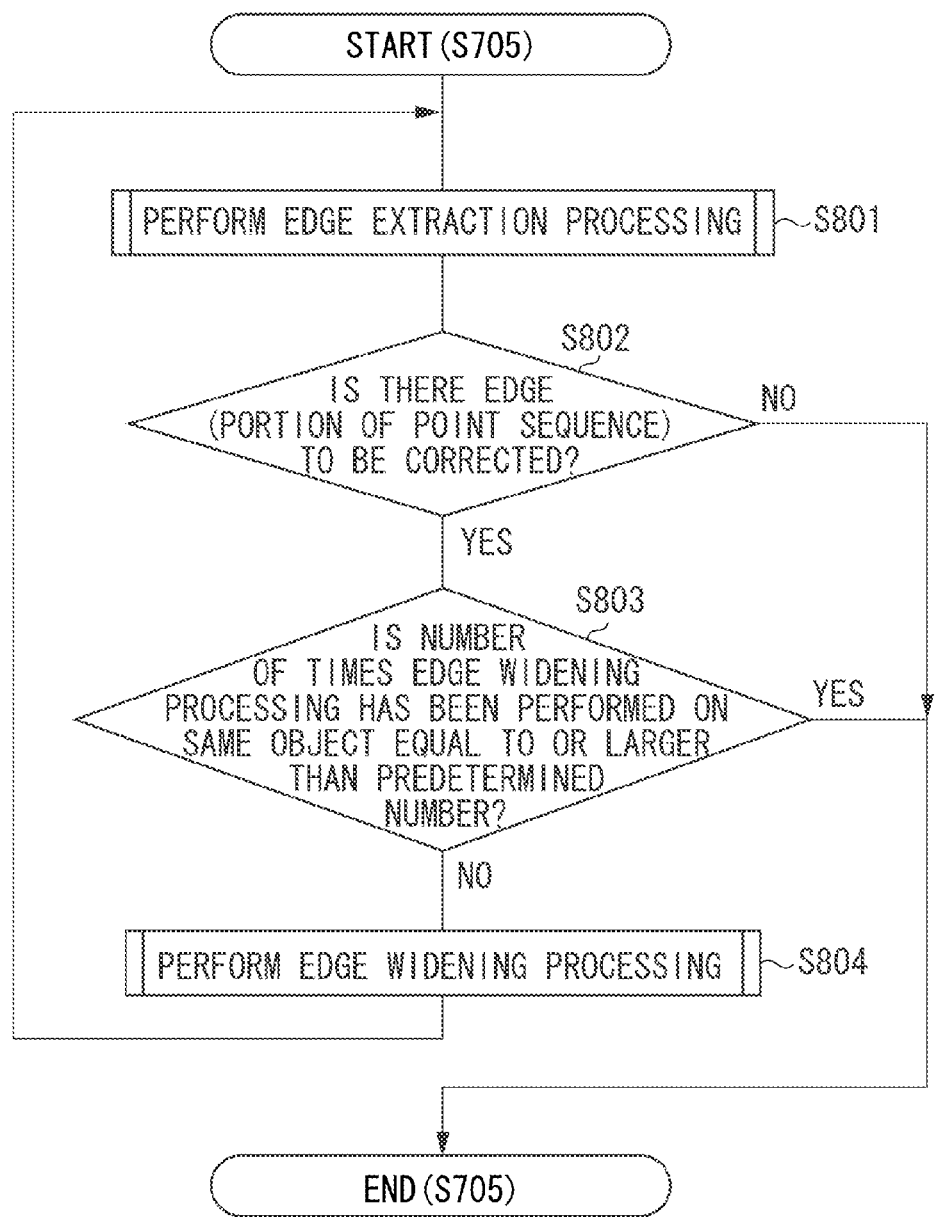
FIG. 8 is a flow chart illustrating correction processing according to an exemplary embodiment.

The correction processing performed in step S705 will be described below, with reference to the flow chart illustrated in FIG. 8.

When the execution of the correction processing on the point sequence data (intermediate data) is started, in step S801, the edge extraction unit 15 performs the edge extraction processing, which will be described in detail below with reference to FIG. 4.

Next, in step S802, the edge widening processing unit 16 determines whether there is an edge (portion of point sequence) to be corrected by the edge widening processing. This is determined based on whether an edge identifier (ID) is stored in an edge list (FIG. 5F) generated in the edge extraction processing. If an edge ID is stored, the edge widening processing unit 16 determines that there is an edge to be corrected (YES in step S802), and the processing proceeds to step S803. On the other hand, if no edge ID is stored, the edge widening processing unit 16 determines that there is no edge to be corrected (NO in step S802), and the flow chart is ended.

In step S803, the edge widening processing unit 16 determines whether the number of times the edge widening processing has been performed on the same object (point sequence data representing the same object) is equal to or larger than a predetermined number of times. In the present exemplary embodiment, the predetermined number of times is 10 but is not limited to 10. The determination is executed to prevent the shape of the object from being excessively changed by repeating the edge widening processing on the same object. The edge widening processing unit 16 functions as a control unit for controlling the edge extraction unit 15 and the edge widening processing unit 16 to repeat the series of processing, i.e., the edge extraction processing and the edge widening processing.

If the number of times the edge widening processing has been performed is equal to or larger than the predetermined number of times (YES in step S803), the flow chart is ended. On the other hand, if the number of times the edge widening processing has been performed is smaller than the predetermined number of times (NO in step S803), then in step S804, the edge widening processing unit 16 performs the edge widening processing to increase the width of the portion of the object in a predetermined direction (the longitudinal direction in the present exemplary embodiment), as illustrated in FIGS. 6A to 6E.

Figure 9A:
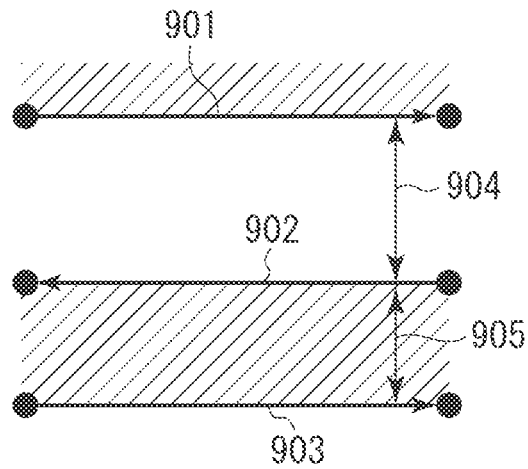
FIGS. 9A, 9B, and 9C illustrate an example of an effect of edge widening processing on other edges.
Figure 9B:
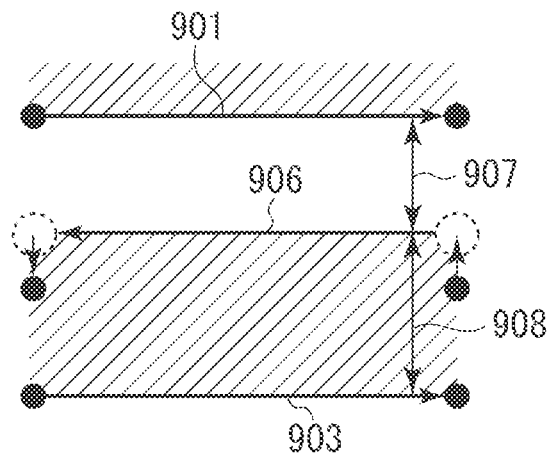
Figure 9C:
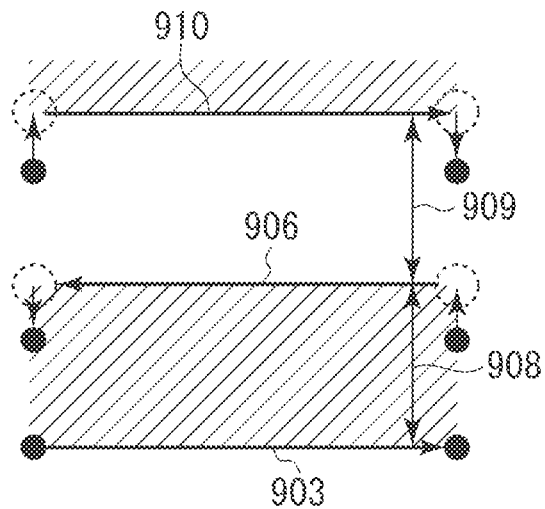

As described above, the edge extraction processing and the edge widening processing in steps S801 to S804 are repeatedly performed up to nine times (i.e., within the range of the predetermined number of times). The processing is repeatedly performed so that the portion of the object is prevented from becoming solid. A specific example is illustrated in FIGS. 9A to 9C. FIG. 9A illustrates edges 901, 902, and 903 constituting an outline of the same object. Each shaded portion in FIGS. 9A to 9C is an inside of the outline of the object. A distance 904 is the distance between the edges 901 and 902, and a distance 905 is the distance between the edges 902 and 903. In a case where the distance 904 is equal to or greater than the minimum guarantee line width (i.e., equal to or greater than the threshold) and the distance 905 is narrower than the minimum guarantee line width (i.e., smaller than the threshold), the edge 906 is generated by the edge widening processing as illustrated in FIG. 9B. As a result, the width of the portion (lower shaded portion) of the object is increased to a distance 908 (the distance between the edges 906 and 903). However, there may be a case where a distance 907, which is the distance between the edges 901 and 906, becomes shorter than the minimum guarantee line width. In this case, depending on the filling rule of the rasterization processing, a white portion may be filled with the color of the inside of the outline of the object. That is to say, the portion of the object may become solid. As a solution to the case, the edge extraction processing and the widening processing in steps S801 to S804 are performed to increase the distance 907, which has become shorter than the minimum guarantee line width. The result is illustrated in FIG. 9C. In FIG. 9C, an edge 910 is generated, and a distance 909, which is the between the edges 910 and 906, is equal to or greater than the minimum guarantee line width (i.e., equal to or greater than the threshold), whereby the portion of the object is prevented from becoming solid by the rasterization processing.

As described above, the edge widening processing is repeated again and again so that the portion of the object can be prevented from becoming solid. However, if no upper limit is set for the repeat of the processing, depending on the object, the object may excessively be extended upward to result in an excessive change in the shape of the object. To prevent the shape change, as described above, the upper limit (predetermined number of times) is set for the number of times of the repeat of the processing.

<Edge Extraction Processing>

Figure 4:
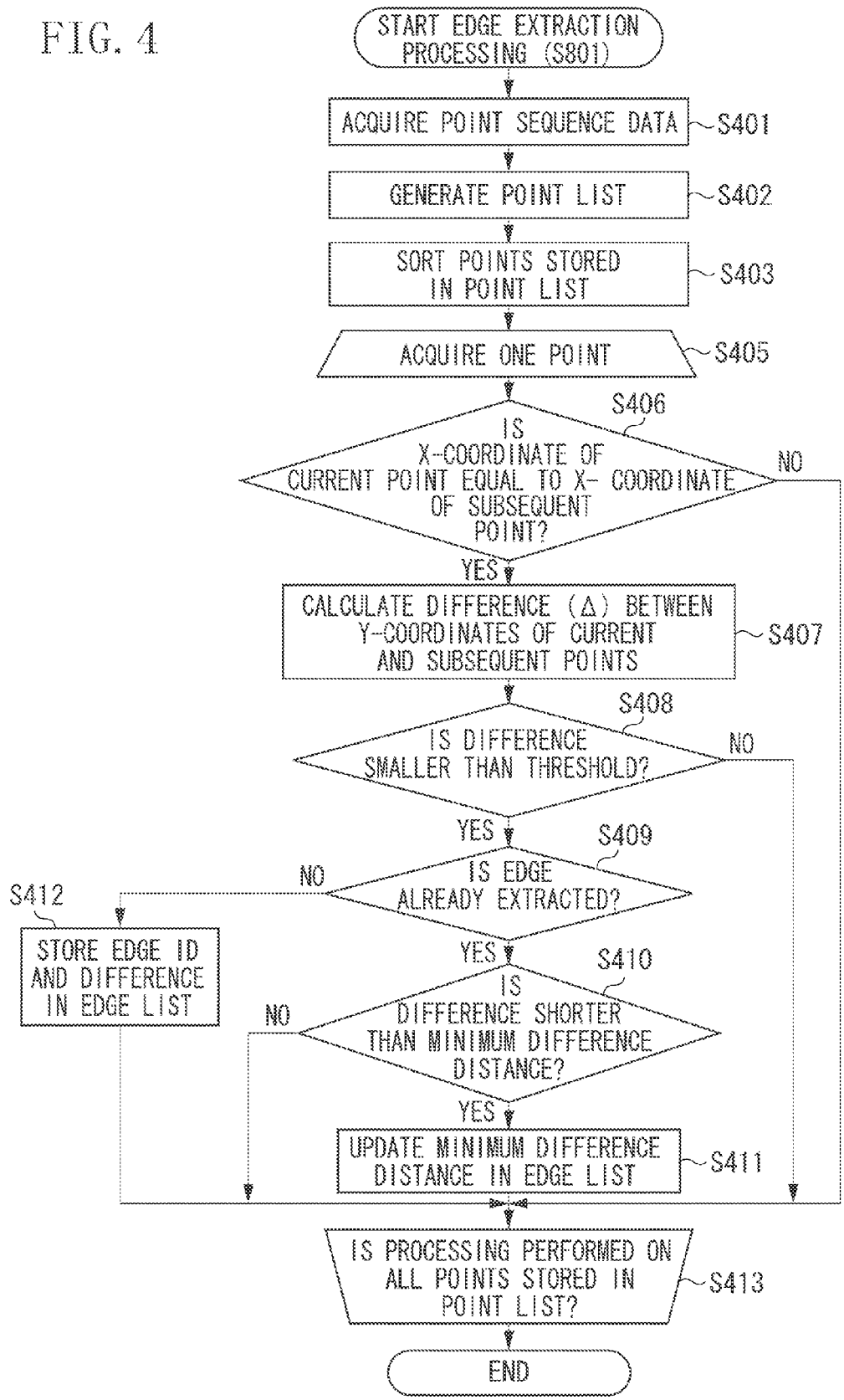
FIG. 4 is a flow chart illustrating edge extraction processing according to an exemplary embodiment.

FIG. 4 is a flow chart illustrating the edge extraction processing of step S801 to be performed by the edge extraction unit 15.

The process illustrated in the flow chart is conceptually the processing to calculate the width of an object represented by point sequence data in a predetermined direction and identify a portion of the object that is likely to be lost in the rasterization processing to be performed afterward. The identification processing is performed by extracting edges that the distance between the edges is shorter than a threshold.

Figure 5A:
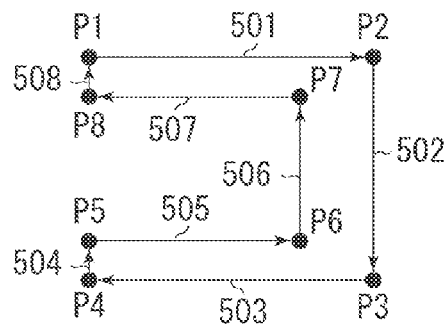
FIGS. 5A, 5B, 5C, 5D, 5E, and 5F illustrate the edge extraction processing according to an exemplary embodiment.

In step S401, the edge extraction unit 15 acquires intermediate data (point sequence data) and generates edges. For convenience of description, a case where point sequence data as illustrated in FIG. 5A is acquired will be described below. The point sequence data illustrated in FIG. 5A contains eight points P1 to P8. The edge extraction unit 15 connects the eight points in connection order to generate eight line segments (edges) 501 to 508. Each edge has a direction according to the connection order of the point sequence. For example, the edge 501 has a direction from P1 to P2. Further, each edge has ID information (edge ID) for identification of the edge. The edge IDs of the edges 501 to 508 are 1 to 8, respectively.

In step S402, the edge extraction unit 15 generates a point list. The point list is generated by the following procedure. The edge extraction unit 15 calculates for each edge the Y-coordinates of an edge at along the direction of the edge at a plurality of X-coordinates set with regular intervals in the X-axis direction. This calculation is performed by deriving an equation (y=ax+b) representing a line segment connecting both end points of an edge based on the coordinates of the both end points and then assigning the value of each X-coordinate to x in the equation. Then, the edge extraction unit 15 associates the X- and Y-coordinates of an intersection point of the edge with the edge ID of the edge. Then, the edge extraction unit 15 stores the associated X- and Y-coordinates and edge ID as point data (hereinafter, "point") in the point list. At the time of the storing in the point list, the edge extraction unit 15 links the point to the direction of the edge and stores the linked point.

The regular intervals for the calculation of the Y-coordinates are set to detect a position in the lateral direction at which a portion of the object extending in the lateral direction is likely to be lost. Although smaller intervals are suitable, excessively small intervals lead to an excessively large amount of calculation in the calculation of the Y-coordinates and the subsequent processing. Thus, it is suitable to set an appropriate value for the intervals. In the present exemplary embodiment, the value for the intervals is set to 0.2 mm (≈0.05 inch).

Figure 5B:
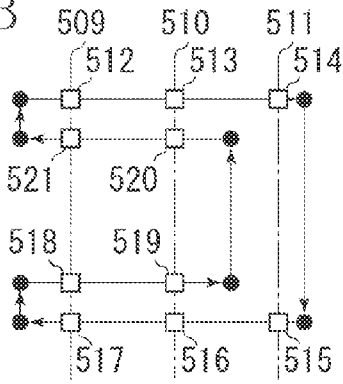
Figure 5C:
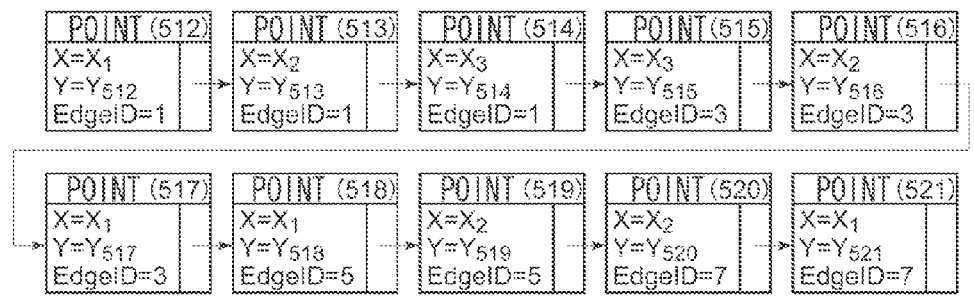

FIG. 5B illustrates how the Y-coordinates are acquired from the point sequence data illustrated in FIG. 5A, and FIG. 5C illustrates a point list acquired from the point sequence data illustrated in FIG. 5A. In the example illustrated in FIG. 5B, the Y-coordinates of intersection points at which longitudinal lines of X-coordinates 509, 510, and 511 set with regular intervals n intersect with the edge 501 are calculated along the direction of the edge. More specifically, the Y-coordinates of intersection points 512, 513, and 514 are calculated in this order. Next, the X- and Y-coordinates of the intersection points 512 to 514 are associated with an edge ID "1" of the edge 501. Then, the X- and Y-coordinates and the edge ID of the intersection point 512 are stored as a point (512) in the point list. The foregoing processing is performed for the intersection points 513 and 514. As a result, as illustrated in FIG. 5C, the point list in which the point (512), a point (513), and a point (514) are linked in this order is obtained. The same processing as that performed with respect to the edge 501 is also performed with respect to other edges 503, 505, and 507. The points of different edges are linked in ascending edge ID order. More specifically, the points are linked in the order specified in FIG. 5C.

Figure 5D:
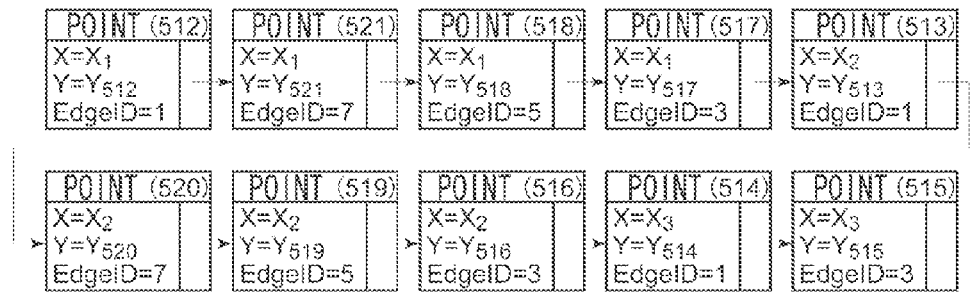

In step S403, the edge extraction unit 15 sorts the points stored in the point list. This sort processing is the processing to sort the points in ascending X-coordinate order and then sort the points having the same X-coordinate in ascending Y-coordinate order. As a result of the sort processing, the point list illustrated in FIG. 5C is converted into a point list illustrated in FIG. 5D.

In step S405, the edge extraction unit 15 acquires one point stored in the point list according to the linking order. For convenience, the acquired point will be referred to as a current point.

In step S406, the edge extraction unit 15 compares the X-coordinate of the current point to the X-coordinate of a subsequent point which comes immediately after the current point in the linking order to determine whether the X-coordinates are equal. If the X-coordinates are equal (YES in step S406), the processing of step S407 is performed. On the other hand, if the X-coordinates are not equal (NO in step S406), the processing of step S413 is performed.

Figure 5E:
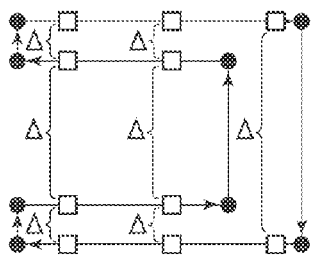
Figure 5F:
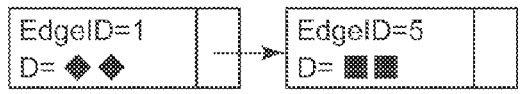

In step S407, the edge extraction unit 15 calculates the distance between paths representing the outline of the object. More specifically, the edge extraction unit 15 calculates a difference (Δ) between the Y-coordinate of the current point and the Y-coordinate of the subsequent point. The difference Δ is the distance at an X-coordinate between the edge to which the current point belongs and the edge to which the subsequent point belongs. In other words, the difference Δ represents the width of the portion of the object represented by the two edges (line segment path) in the longitudinal direction at a predetermined position in the lateral direction. In FIG. 5E, each of the distances between the points illustrated the FIG. 5B is denoted by Δ.

In step S408, the edge extraction unit 15 determines whether the difference (Δ) calculated in step S407 is smaller than the threshold (minimum guarantee line width (d) calculated by the minimum guarantee line width calculation unit 14). If the difference (Δ) is smaller than the threshold (YES in step S408), the processing of step S409 is performed. On the other hand, if the difference (Δ) is not smaller than the threshold (NO in step S408), the processing of step S413 is performed.

In the case where the difference (Δ) is smaller than the threshold (minimum guarantee line width (d)), the width of the portion of the object in the longitudinal direction is smaller than the minimum guarantee line width (d). That is to say, the processing of step S408 is the determination of whether the portion of the object is likely to be lost by the rasterization processing.

In step S409, the edge extraction unit 15 determines whether the edge to which the current point belongs is already extracted. If the edge is not extracted (NO in step S409), the processing of step S412 is performed. On the other hand, if the edge is already extracted (YES in step S409), the processing of step S410 is performed. The extracted edge refers to an edge indicating that the width of the portion of the object constituted by the edge is smaller than the threshold. The edge extraction unit 15 performs the determination by referring to the edge list illustrated in FIG. 5F and determining whether the edge ID of the current point exists in the edge list. The edge list is managed for each object, and existence of an edge ID in the edge list indicates that there is an edge that constitutes a portion of the object and has a narrower width in the predetermined direction than the threshold.

If the edge ID does not exist in the edge list, the edge extraction unit 15 determines that the edge to which the current point belongs is not extracted. On the other hand, if the edge ID exists in the edge list, the edge extraction unit 15 determines that the edge to which the current point belongs is already extracted. The edge list stores the edge ID and the minimum difference distance (D) associated with the edge ID. The minimum difference distance (D) refers to the closest distance between the edge identified by the edge ID and an edge below the identified edge. More specifically, the minimum difference distance (D) indicates the minimum value of the width of the portion of the object in the longitudinal direction. The minimum difference distance (D) is used in the edge widening processing described below.

In step S412, the edge extraction unit 15 stores the edge ID of the current point in the edge list and also stores the difference (Δ) obtained in step S407 in the edge list as the minimum difference distance (D) associated with the edge ID. Then, the processing proceeds to step S413.

In step S410, the edge extraction unit 15 determines whether the difference (Δ) obtained in step S407 is shorter than the minimum difference distance (D) associated with the edge ID of the current point. If the difference (Δ) is shorter than the minimum difference distance (D) (YES in step S410), the fact indicates that the minimum value of the width of the portion of the object in the longitudinal direction has been updated. Thus, in step S411, the edge extraction unit 15 updates the minimum difference distance (D) in the edge list to the difference (Δ). On the other hand, if the difference (Δ) is equal to or greater than the minimum difference distance (D) (NO in step S410), the updating of the minimum difference distance is not performed, and the processing proceeds to step S413.

In step S413, edge extraction unit 15 determines whether the processing is performed on all the points stored in the point list. If the processing is performed on all the points (YES in step S413), the flow chart illustrated in FIG. 4 is ended. On the other hand, if the processing is not performed on all the points (NO in step S413), the processing of step S405 is performed.

While the foregoing describes that the determination of whether the difference (Δ) is narrower than the minimum guarantee line width (d) is performed in the processing of step S408, any other determination may be performed. For example, in a case where the point sequence data generated from the drawing command by the OS 150 for the rasterization resolution M [dpi] (e.g., 600 dpi height) is acquired in step S401 and then the low-resolution conversion according to the printing resolution N (<M) [dpi] (e.g., 400 dpi height) is performed at the time of the rasterization processing. In this case, in place of the processing of step S408 described above, the processing to determine whether the difference (Δ) is equal to or greater than 1/M [inch] and narrower than the minimum guarantee line width (d=1/N [inch]) may be performed. More specifically, targets on which step S409 and subsequent steps are to be performed are limited to portions that are likely to be lost by the low resolution conversion but are not likely to be lost if the low resolution conversion is not performed. In this way, the targets on which step S409 and subsequent steps are to be performed are limited so that the number of calculations in the processing can be reduced to increase the speed.

<Edge Widening Processing>

FIGS. 6A to 6E illustrate an example of the edge widening processing to be performed by the edge widening processing unit 16 in step S804 on the object represented by the point sequence data illustrated in FIG. 5A. The purpose of the edge widening processing is to increase the width of a portion of the object by shifting the position of the path representing the outline of the portion of the object.

Figure 6A:
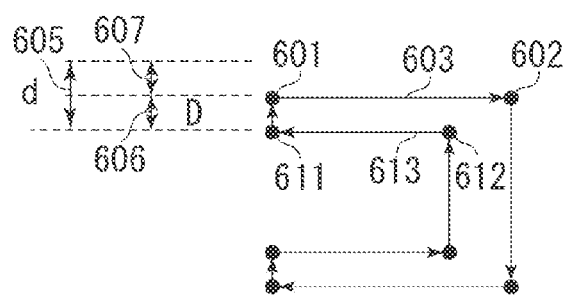
FIGS. 6A, 6B, 6C, 6D, and 6E illustrate edge widening processing according to an exemplary embodiment.

FIG. 6A illustrates a case where an edge 603 (edge 501) connecting a start point 601 (point P1) to an end point 602 (point P2) is extracted in the edge extraction processing described above. The edge 603 constitutes the outline of the portion of the object together with an edge 613 (edge 507). In the example illustrated in FIG. 6A, an edge ID stored in the edge list is "1" and a minimum difference distance 606 associated with the edge ID "1" is D. In this case, the edge widening processing unit 16 corrects the point sequence data (P1 to P8) to increase the width of the portion of the object in the longitudinal direction that is formed by the edges 603 and 613.

Figure 6B:
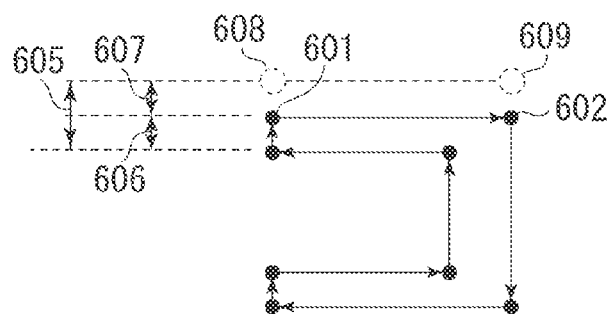
Figure 6C:
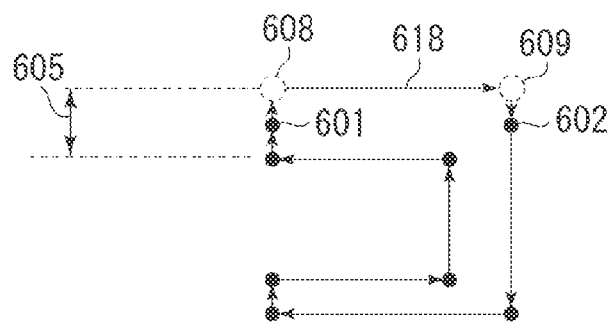

FIGS. 6B and 6C illustrate how the point sequence data is corrected by the edge widening processing unit 16 according to the present exemplary embodiment. FIG. 6B illustrates that the edge widening processing unit 16 adds new points 608 and 609 corresponding to a point sequence (start point 601(P1), end point 602(P2)) corresponding to the portion of the object the width of which is to be increased. The coordinates of the new point 608 are coordinates shifted upward from the coordinates of the point 601 in the longitudinal direction by a distance 607 (value obtained by subtracting the minimum difference distance 606(D) from the minimum guarantee line width 605(d)). Similarly, the coordinates of the new point 609 are coordinates shifted upward from the coordinates of the point 602 in the longitudinal direction by the distance 607 (value obtained by subtracting the minimum difference distance 606(D) from the minimum guarantee line width 605(d)).

Then, as illustrated in FIG. 6C, the edge widening processing unit 16 corrects (changes) the point sequence in which the points 601 and 602 are connected in this connection order to the points 601, 608, 609, and 602 connected in this connection order. As a result of the correction of the connection order, the outline of the portion of the object is formed by an edge 618 connecting the point 608 to the point 609 and the edge 613. More specifically, the edge 603 is deleted, and the edge 618 is generated. The edge deletion and generation is referred to as the shift of the edge 603 by a predetermined amount in the longitudinal direction. As a result, the width of the portion of the object in the longitudinal direction that is formed by the edges 603 and 613 can be increased by the predetermined amount (d−D).

While the edge widening processing unit 16 corrects the path, i.e., point sequence, to correct the width of the portion of the object in the longitudinal direction to the minimum guarantee line width (d) in the present exemplary embodiment, the edge widening processing unit 16 may correct the path to correct the width of the portion of the object in the longitudinal direction to at least the minimum guarantee line width (d) or wider.

Figure 6D:
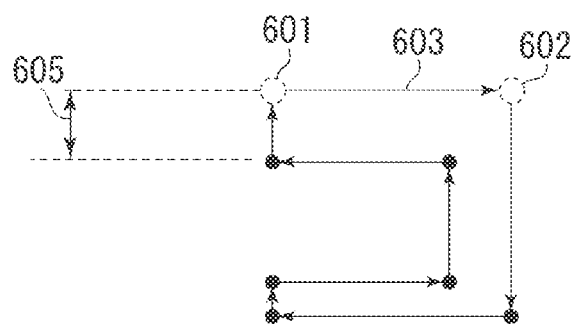
Figure 6E:
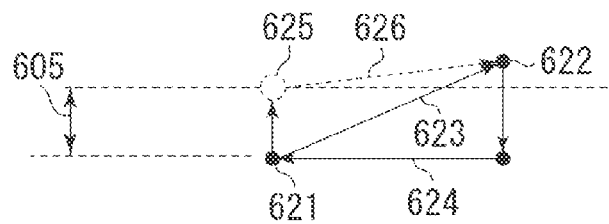

Further, while the two new points are generated in positions to which both end points of the edge (line segment path) are shifted in the longitudinal direction in the present exemplary embodiment, one new point may be generated in a position to which only one of the end points is shifted in the longitudinal direction and a point sequence connecting one of the end points to the other one via the new point may be generated. This example is illustrated in FIG. 6E. FIG. 6E illustrates an edge 623 connecting a point 621 to a point 622. More specifically, the edge 623 is a diagonal line, and the distance between the edge 623 and an edge 624 is shorter than the minimum guarantee line width 605 on the point 621 side and equal to or greater than the minimum guarantee line width on the point 622 side. In a case where the foregoing conditions are satisfied, a point 625 is additionally generated in a position shifted in the longitudinal direction from the point 621 by the minimum guarantee line width 605, and the point 621 is connected to the point 622 via the point 625. More specifically, the edge widening processing unit 16 corrects the connection order to the points 621, 625, and 622 after the addition of the point 625. By this correction, the distance between the edges 626 and 624 is kept equal to or greater than the minimum guarantee line width so that the portion of the object can be prevented from being lost by the rasterization processing performed after the reduction of the object. Furthermore, since the height (length in the longitudinal direction) of the object after the rasterization processing is kept on the point 622 side, the shape of the original object can be reflected in the shape of the object.

While the foregoing describes the edge widening processing on the edge 603, a point sequence corresponding to one edge is corrected in one edge widening processing.

As described above, the width of the object is calculated, and whether the width of a portion of the object should be increased is determined based on the calculated width and the processing to increase the width is performed only on the portion to be increased so that unnecessary correction can be eliminated.

The foregoing describes the processing to be performed in the printer driver 10 according to the present exemplary embodiment.

As a modification of the exemplary embodiment, the flow chart illustrated in FIG. 7 may be executed by the controller 21 of the printing apparatus 2 in place of the printer driver 10.

In the first exemplary embodiment, the edge widening processing is realized by increasing point sequences constituting edges, as described above with reference to FIGS. 6A to 6C. However, the increase in the point sequences leads to complication of the rasterization processing. Thus, in the present exemplary embodiment, instead of increasing point sequences, the coordinates of points of point sequences are updated. A result is illustrated in FIG. 6D. More specifically, as illustrated in FIG. 6D, the coordinates of the point 601 are updated to the coordinates of the point 608 in FIG. 6C, and the coordinates of the point 602 are updated to the coordinates of the point 609 in FIG. 6C. By this updating, the width of the portion of the object can be increased without changing the number of point sequences and the connection order in the point sequence data.

While the correction processing of step S705 is performed prior to the resolution conversion processing included in the rasterization processing in the first and second exemplary embodiments described above, the correction processing of step S705 may be executed after the resolution conversion processing. In the case where the correction processing of step S705 is to be performed after the resolution conversion processing, the edge extraction processing and the edge widening processing may be performed on the point sequence data having undergone the resolution conversion processing, and then the point sequence data having undergone the correction processing may be rasterized at the rasterization resolution. In this case, the minimum guarantee line width in the edge extraction processing is 1/(rasterization resolution).

Further, while the first and second exemplary embodiments describe the case where points are connected by line segment paths (edge), an exemplary embodiment of the present invention is also applicable to a case where points are connected by a curved path such as a Bézier curve. In this case, a plurality of line segment paths may be generated by linear approximation of the curved path, and the same processing as in the first and second exemplary embodiments may be performed on each line segment path.

Further, while the first and second exemplary embodiments are mainly directed to preventing a portion (lateral line portion) of an object from being lost by the layout processing and the resolution conversion processing in the longitudinal direction by shifting the position of a path representing an outline of the portion of the object in the longitudinal direction. An exemplary embodiment of the present invention, however, is not limited to the prevention of the loss of a lateral line portion. An exemplary embodiment of the present invention can also be applied to prevent a portion (longitudinal line portion) of an object from being lost by the layout processing and the resolution conversion processing in the lateral direction. To prevent the longitudinal line portion from being lost, processing similar to the processing (the processing to calculate the distance between paths in the longitudinal direction and the processing to shift the positions of the paths in the longitudinal direction) performed with respect to the longitudinal direction as described above is performed with respect to the lateral direction. More specifically, the processing to calculate the distance between paths in the lateral direction and the processing to shift the positions of the paths in the lateral direction based on the calculation result may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present invention, the loss of a portion of an object can be prevented without a significant change in the shape of the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-194369, filed Sep. 24, 2014, which is hereby incorporated by reference herein in its entirety.

What is claimed is:

1. An image processing apparatus comprising:
a memory; and
a processor in communication with the memory, wherein the processor performs:
acquiring a plurality of points defining a plurality of line segments constituting an outline of an object, the plurality of line segments including a first line segment and a second line segment;
identifying the first line segment having a shorter distance to the second line segment than a threshold by calculating a distance in a predetermined direction between the first line segment and the second line segment based on coordinates of the plurality of points, wherein the threshold is an inverse number of a printing resolution of a printing engine;
correcting a position of at least one of points defining the identified first line segment so that the distance between the first line segment after the correction and the second line segment is the threshold, wherein the threshold is the inverse number of the printing resolution of the printing engine;
rasterizing the object based on the plurality of corrected points; and
transmitting the rasterized object for printing at the printing resolution of the print engine.

2. The image processing apparatus according to claim 1, wherein the correction is performed by generating a new point at a position shifted by a predetermined amount from one of the points defining the identified first line segment and correcting the points in such a manner that the first line segment having is defined by the points and the generated new point.

3. The image processing apparatus according to claim 1, wherein the correction is performed by generating two new points at positions respectively shifted by a predetermined amount from the points defining the identified first line segment and correcting the points in such a manner that the first line segment is defined by the generated two new points.

4. The image processing apparatus according to claim 1, wherein the correction is performed by shifting the position of the at least one of the points defining the identified first line segment by a predetermined amount in a predetermined direction so that the distance between the first line segment after the correction and the second line segment is the threshold or wider, wherein the threshold is the inverse number of the printing resolution of the printing engine.

5. The image processing apparatus according to claim 1, wherein the identification is executed by:
calculating a plurality of distances from a plurality of positions on a target line segment to the second line segment; and
identifying the target line segment as the first line segment having a shorter distance to the second line segment than the threshold in a case where a shortest distance among the plurality of calculated distances is shorter than the threshold.

6. The image processing apparatus according to claim 1, wherein the correction is repeated within a range smaller than a predetermined number of times for the object.

7. The image processing apparatus according to claim 1, wherein the rasterization is performed by undergoing coordinates conversion processing on the plurality of corrected points based on the printing resolution.

8. The image processing apparatus according to claim 1, wherein the plurality of points acquired by the acquisition are points in which coordinates conversion processing has been already performed on a plurality of points corresponding to the outline of the object.

9. The image processing apparatus according to claim 1, wherein the object is a character, a line, or a graphic.

10. An image processing apparatus comprising:
a memory; and
a processor in communication with the memory, wherein the processor performs:
identifying a portion of vector data object which has a narrower width than a threshold, wherein the threshold is an inverse number of a printing resolution of a printing engine;
correcting the identified portion of the vector data object so that the width of the identified portion of the vector data object becomes the threshold, wherein the threshold is an inverse number of a printing resolution of a printing engine;
rasterizing the corrected vector data object; and
transmitting the rasterized vector data object for printing at the printing resolution of the print engine.

11. An image processing method comprising:
acquiring a plurality of points defining a plurality of line segments constituting an outline of an object, the plurality of line segments including a first line segment and a second line segment;
identifying the first line segment having a shorter distance to the second line segment than a threshold by calculating a distance between the first line segment and the second line segment based on coordinates of the plurality of points, wherein the threshold is an inverse number of a printing resolution of a printing engine;
correcting a position of at least one of points defining the identified first line segment so that the distance between the first line segment after the correction and the second line segment is the threshold, wherein the threshold is the inverse number of the printing resolution of the printing engine; and
rasterizing the object based on the plurality of corrected points; and
transmitting the rasterized object for printing at the printing resolution of the print engine.

12. A non-transitory computer readable medium storing a program which causes at least one processor to perform an image processing method, the method comprising:
acquiring a plurality of points defining a plurality of line segments constituting an outline of an object, the plurality of line segments including a first line segment and a second line segment;
identifying the first line segment having a shorter distance to the second line segment than a threshold by calculating a distance between the first line segment and the second line segment based on coordinates of the plurality of points, wherein the threshold is an inverse number of a printing resolution of a printing engine;
correcting a position of at least one of points defining the identified first line segment so that the distance between the first line segment after the correction and the second line segment is the threshold, wherein the threshold is the inverse number of the printing resolution of the printing engine;
rasterizing the object based on the plurality of corrected points; and transmitting the rasterized object for printing at the printing resolution of the print engine.

* * * * *